United States Patent
Bannert et al.

(10) Patent No.: US 10,762,403 B2
(45) Date of Patent: Sep. 1, 2020

(54) MANUFACTURING METHOD FOR PORTABLE DATA CARRIERS

(71) Applicant: GIESECKE+DEVRIENT MOBILE SECURITY GMBH, Munich (DE)

(72) Inventors: Stefan Bannert, Munich (DE); Peter Kaufmann, Munich (DE); Lucas Perlitz, Munich (DE); Thomas Tarantino, Laufen (DE); Robert Griesmeier, Bruckmühl (DE); Tatjana Mosthof, Munich (DE); Cordula Regensburger, Utting (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 324 days.

(21) Appl. No.: 15/873,186

(22) Filed: Jan. 17, 2018

(65) Prior Publication Data

US 2018/0144222 A1 May 24, 2018

Related U.S. Application Data

(62) Division of application No. 15/038,945, filed as application No. PCT/EP2014/002886 on Oct. 24, 2014, now Pat. No. 10,163,047.

(30) Foreign Application Priority Data

Nov. 26, 2013 (DE) .......................... 10 2013 019 849

(51) Int. Cl.
*H01Q 17/00* (2006.01)
*G06K 19/02* (2006.01)
(Continued)

(52) U.S. Cl.
CPC ........... *G06K 19/022* (2013.01); *B42D 25/00* (2014.10); *B42D 25/23* (2014.10); *B42D 25/355* (2014.10);
(Continued)

(58) Field of Classification Search
CPC ......... G06K 19/07718; G06K 19/0723; G06K 19/07749; G06K 19/10; G06K 19/025;
(Continued)

(56) References Cited

U.S. PATENT DOCUMENTS

| 6,752,430 B2 * | 6/2004 | Holt ........................ G07F 7/086 283/114 |
| 7,533,455 B2 | 5/2009 | Wehr |

(Continued)

FOREIGN PATENT DOCUMENTS

| DE | 10233927 A1 | 2/2004 |
| DE | 102008053096 A1 | 4/2010 |

(Continued)

OTHER PUBLICATIONS

German Search Report from German Application No. 102013019849.6, dated Jul. 7, 2014.

(Continued)

*Primary Examiner* — Thiem D Phan
(74) *Attorney, Agent, or Firm* — Workman Nydegger

(57) ABSTRACT

A method for manufacturing a portable data carrier by means of a continuous manufacturing method, comprises the steps: providing at least one foil as a rolled good, unrolling at least one first foil, with at least a first foil being coated at least partly with an adhesive on at least one side, with at least the first foil being scored on at least one side along at least one creasing edge, with at least the first foil being folded up in precise fit along at least one creasing edge and bonded, with the foil being folded up in the direction of the side which is coated with adhesive, with the side coated with adhesive being arranged on the opposite side of the foil which has at least one scored creasing edge along which it is folded.

14 Claims, 1 Drawing Sheet

(51) Int. Cl.
- *G06K 19/07* (2006.01)
- *G06K 19/077* (2006.01)
- *B42D 25/00* (2014.01)
- *B42D 25/23* (2014.01)
- *B42D 25/355* (2014.01)
- *B42D 25/47* (2014.01)
- *B42D 25/475* (2014.01)
- *B42D 25/378* (2014.01)

(52) U.S. Cl.
CPC ........... *B42D 25/378* (2014.10); *B42D 25/47* (2014.10); *B42D 25/475* (2014.10); *G06K 19/07* (2013.01); *G06K 19/07718* (2013.01); *G06K 19/07722* (2013.01); *Y10T 29/49016* (2015.01); *Y10T 29/49018* (2015.01)

(58) Field of Classification Search
CPC ....... G06K 19/07779; G06K 19/07783; H05K 2201/10098; Y10T 29/49002; Y10T 29/49155; Y10T 29/49016; Y10T 29/49018; Y10T 428/1495; Y10T 156/1051; B32B 2519/02
USPC ............... 29/592.1, 600, 601, 825, 829, 846
See application file for complete search history.

(56) References Cited

U.S. PATENT DOCUMENTS

| | | |
|---|---|---|
| 2001/0002753 A1 | 6/2001 | Hollwarth-Oberholz et al. |
| 2012/0125993 A1 | 5/2012 | Thiele et al. |
| 2012/0319393 A1 | 12/2012 | Fischer |

FOREIGN PATENT DOCUMENTS

| | | |
|---|---|---|
| EP | 1107213 A2 | 6/2001 |
| WO | 2010043422 A1 | 4/2010 |

OTHER PUBLICATIONS

International Search Report from PCT Application No. PCT/EP2014/002886, dated Mar. 9, 2015.
European Office Action from EP Application No. 14792742.0, dated Dec. 8, 2017.
U.S. Appl. No. 15/873,147, Docketed New Case.
U.S. Appl. No. 15/873,221, Docketed New Case.
U.S. Appl. No. 15/873,268, Docketed New Case.
U.S. Appl. No. 15/873,329, Docketed New Case.

* cited by examiner

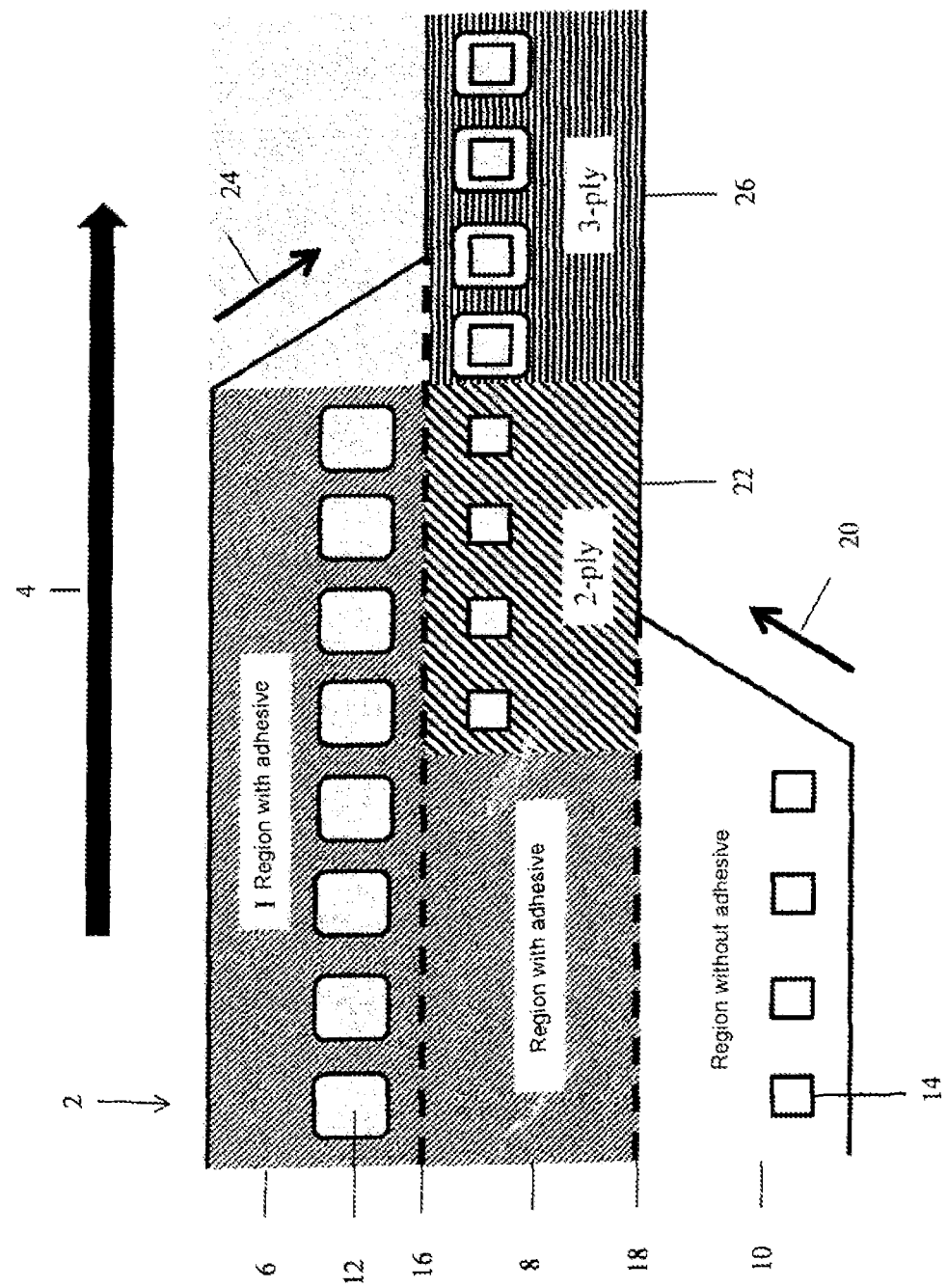

MANUFACTURING METHOD FOR PORTABLE DATA CARRIERS

BACKGROUND

The invention describes a manufacturing method for portable data carriers.

Portable data carriers, such as for example SIM cards, credit cards, health cards, identity cards etc. are usually manufactured by an injection molding method or a lamination method.

SIM cards are normally manufactured by an injection molding method which is very expensive and means a high material expenditure. The high expenditure is due to the fact that SIM cards are often broken off from cards in ID-1 format. Therefore, the largest part of the ID-1 card is thrown away after the breaking off of the SIM card. Furthermore, the manufacture of, for example, credit cards is more or less a single-piece production. The quasi single-piece production entails a sequential manual processing which is very time-intensive and cost-intensive.

When portable data carriers are manufactured by means of lamination method, due to high temperatures, e.g. between 120 and 160 degrees Celsius, and high pressures, e.g. between 100 and 250 bar, the components of the data carrier are subjected to a high load. This often leads to a damage of the components, such as for example antenna coils, chips. Components sensitive to such loads, such as for example display elements, therefore cannot be processed by means of a lamination method. Further, the lamination method takes a relatively long time until the different foil layers have permanently combined under pressure and temperature.

From the prior art there is known a method for manufacturing a portable data carrier by means of a continuous manufacturing method which as a first step provides at least one foil as a rolled good and unrolls at least one first foil for the method. The at least one first foil is coated at least partly with an adhesive on at least one side. The adhesive may be liquid or paste-like. Further, the adhesive may be processed e.g. also in the form of a double-sided adhesive tape or in any other suitable form. Then, at least the first foil is scored on at least one side along at least one creasing edge. After scoring, at least the first foil is folded up in precise fit along at least one creasing edge and bonded. In doing so, the foil is so folded that the foil is folded in the direction of the side which is coated with adhesive. The side coated with adhesive here is arranged on the opposite side of the foil which has at least one scored creasing edge along which it is folded. In the end, at least one data carrier is detached from the at least one folded and bonded foil, e.g. by means of a laser or a punch or a water jet.

A disadvantage of the prior art is that accordingly manufactured data carriers can be easily forged.

SUMMARY

Starting out from the prior art, it is the object of the invention to find a solution which avoids the disadvantage described above.

For achieving the object the invention discloses a method for manufacturing a portable data carrier by means of a continuous manufacturing method, comprising the steps:
   providing at least one foil as a rolled good,
   unrolling at least one first foil,
   with at least the first foil being coated at least partly with an adhesive on at least one side,
   with at least the first foil being scored on at least one side along at least one creasing edge,
   with at least the first foil being folded up in precise fit along at least one creasing edge and bonded,
   with the foil is folded up in the direction of the side which is coated with adhesive,
   with the side coated with adhesive being arranged on the opposite side of the foil which has at least one scored creasing edge along which it is folded,
   which is characterized by the fact that on at least one foil at least a part of a security element and/or at least one security element is arranged on an arbitrary side of the foil.

An advantageous embodiment example is that the security element is processed by feeding it from a roll or as a bulk material.

Another advantageous embodiment example is that the security element is incorporated into an area of the foil, which is coated with adhesive.

Another advantageous embodiment example is that the security element is embossed into at least one foil of the data carrier.

Another advantageous embodiment example is that the security element is arranged on at least one outer side of the data carrier and/or in the interior of the data carrier.

Another advantageous embodiment example is that the security element effects a chemical reaction.

Another advantageous embodiment example is that a scented lacquer, a color indicator, a catalyst or a test strip is used as a security feature which effects a chemical reaction.

Another advantageous embodiment example is that the security element effects an optical reaction.

Another advantageous embodiment example is that a self-luminous ink, a security thread, champs or metal pigments are used as a security feature which effects an optical reaction.

Another advantageous embodiment example is that the security element effects a haptic reaction.

Another advantageous embodiment example is that a logo or a Braille character is used as a security feature which effects a haptic reaction. Advantageously, the security features effecting a haptic reaction are embossed into a foil.

Another advantageous embodiment example is that the adhesive itself includes at least a part of a security feature and/or at least one security feature.

Another advantageous embodiment example is that a foil is used which includes at least a part of a security feature and/or at least one security feature on at least one surface and/or in its interior.

Further, for achieving the object the invention discloses a data carrier which is manufactured according to the method described above.

BRIEF DESCRIPTION OF THE DRAWINGS

Embodiment examples of the invention are hereinafter described in more detail with reference to the attached figure.

FIG. 1 in principle shows the procedure of folding a foil according to the invention with reference to a two-step folding for manufacturing a data carrier. Although, a single-step or multi-step folding is also possible.

DETAILED DESCRIPTION OF VARIOUS EMBODIMENTS

FIG. 1 in principle shows the procedure of folding a foil 2 according to the invention with reference to a two-stage folding. A foil 2 is transported in the direction of machine operation 4 during the method. The foil 2 here has three regions 6, 8 and 10. Each of the regions 6 and 10 has several gaps 12 and 14 which were punched into the foil 2. The gaps 12 and 14 serve for the formation of a gap, into which a module, e.g. a chip module, is inserted. The regions 6 and 8 are coated with adhesive. Before the foil 2 is folded according to the invention, two scored lines 16 and 18 are scored into the foil 2 to facilitate the subsequent folding. First, the region 10 is folded in the direction 20 along the scored line 18, so that the region 10 comes to lie in precise fit on the region 8 coated with adhesive and is bonded thereto. The resulting region 22 is two-ply and has the gaps 14 at its surface. Next, the region 6 is folded in the direction 24 along the scored line 16 in precise fit onto the region 22 and bonded thereto. The result is now a three-ply foil in the region 26. The regions 6, 8 and 10 were folded in precise fit onto each other and bonded together, so that, for example, the gaps 12 and 14 have come to lie exactly one above the other. Tensions in the resulting card cancel each other out by an odd-numbered folding, e.g. single or triple folding in the method according to the invention. The orientations possibly present in the at least one foil cancel each other out by folding according to the invention. A resulting bulge or a distortion of the product is avoided thereby. In addition to the method described above it is possible to introduce in precise fit and to also bond a further foil during the folding. Therefore, constructions made of several foil layers and adhesive layers are realizable. This is interesting in particular when gaps in different planes, independent of the material thickness of a foil, are necessary. At the end of the method at least one data carrier, e.g. a SIM card or a credit card is punched out from the at least one folded and bonded foil. Alternatively to the punching, any other suitable method can be used for separating data carriers from the folded and bonded foil, e.g. separating by means of laser or water jet.

According to the invention, during the above-described procedure of folding at least one foil 2 at least one security element is arranged on at least one outer side and/or in the interior of the data carrier to be manufactured. For reasons of clarity, a representation of a security element in FIG. 1 has been omitted.

The security element is supplied to the procedure described above from a roll or as bulk material.

The security element is supplied such that it is incorporated into an area 6, 8 of the foil 2, which is coated with adhesive.

Alternatively, the security element may be embossed into at least one foil 2 of the data carrier.

The security element may effect a chemical, optical or haptic reaction when used.

As a security feature which effects a chemical reaction there may be used, for example, a scented lacquer, a color indicator, a catalyst or a test strip.

As a security feature which effects an optical reaction there may be used, for example, a self-luminous ink, a security thread, champs or metal pigments.

As a security feature which effects a haptic reaction with a user of the data carrier there can be used, for example, a logo or a Braille character.

The invention claimed is:

1. A method for manufacturing a portable data carrier by means of a continuous manufacturing method, the method comprising the steps:

providing a first foil as a rolled good,
    unrolling the first foil,
    coating the first foil at least partly with an adhesive on at least one side,
    folding up and bonding the first foil in precise fit along the at least one creasing edge, such that first gaps provided in a first area of the first foil align with second gaps provided in a second area of the first foil,
        wherein the first foil is folded up in the direction of the side which is coated with the adhesive,
wherein on the first foil at least a part of a security element or at least one security element is arranged on an arbitrary side of the first foil;
wherein the security element is embossed into at least one foil of the data carrier.

2. A data carrier which is manufactured according to and having the features of the data carrier in the method of the claim 1.

3. The method according to claim 1, wherein the side coated with adhesive is arranged on the opposite side of the foil which has at least one scored creasing edge along which it is folded.

4. The method according to claim 1, wherein the security element is embossed into at least the first foil.

5. The method according to claim 1, wherein the security element is arranged on at least an outer side of the data carrier.

6. The method according to claim 1, wherein the security element is arranged on at least an inner side of the data carrier.

7. The method according to claim 1, wherein the method is a continuous production method such that a plurality of portable data carriers are produced without interruption.

8. The method according to claim 1, further comprising forming said first gaps in the first area of the first foil.

9. The method according to claim 8, further comprising forming said second gaps in the second area of the first foil.

10. The method according to claim 1, further comprising scoring the first foil on at least one side along at least one creasing edge.

11. The method according to claim 10, further comprising performing a second scoring that includes scoring said first foil on at least a second side along a second creasing edge between the second area and a third area.

12. The method according to claim 11, further comprising performing a second folding and bonding that includes folding said first foil in precise fit along said second creasing edge such that gaps provided in the third area align with said first gaps in the first area of the first foil to form a three-play area wherein the first gaps and second gaps are superimposed such that a chip module can be inserted into an opening formed by each superimposed first gap and second gap.

13. The method according to claim 1, further comprising performing a second folding and bonding that includes folding said first foil in precise fit along a second creasing edge such that gaps provided in a third area align with said first gaps in the first area of the first foil to form a three-play area wherein the first gaps and second gaps are superimposed.

14. The method according to claim 1, further comprising inserting a chip module at least partially into each opening formed by the first gaps superimposed with the second gaps.

\* \* \* \* \*